United States Patent [19]

Hamal et al.

[11] Patent Number: 4,852,107
[45] Date of Patent: Jul. 25, 1989

[54] LASER RESONATOR WITH CHANGEABLE FREQUENCY OF RADIATION

[75] Inventors: Karel Hamal; Jan Marek, both of Prague, Czechoslovakia

[73] Assignee: Ceske vysoke uceni technicke v Praze, Prague, Czechoslovakia

[21] Appl. No.: 43,383

[22] Filed: Apr. 28, 1987

[30] Foreign Application Priority Data

Apr. 28, 1986 [CS] Czechoslovakia ............... 3067-86

[51] Int. Cl.⁴ ............................................. H01S 3/082
[52] U.S. Cl. ...................................... 372/19; 372/12; 372/14; 372/92; 372/97
[58] Field of Search ....................... 372/19, 20, 23, 92, 372/12, 14, 10, 98, 99, 97

[56] References Cited

U.S. PATENT DOCUMENTS

| | | | |
|---|---|---|---|
| 3,679,995 | 7/1972 | Sorokin | 372/97 |
| 4,174,504 | 11/1979 | Chenausky et al. | 372/99 |
| 4,441,186 | 4/1984 | Erickson | 372/19 |
| 4,660,204 | 4/1987 | Dewhirst et al. | 372/99 |

OTHER PUBLICATIONS

Bethea; "Megawatt . . . 1.06 and 1.318μ"; IEEE Journal of Quantum Electronics; Feb. 1973; p. 254.
Higgins; "Computer . . . Fuse Tissue"; News; Lasers and Applications Jan. 1987; p. 22.

*Primary Examiner*—William L. Sikes
*Assistant Examiner*—Xuân Thi Vo
*Attorney, Agent, or Firm*—Klein & Vibber

[57] ABSTRACT

A laser resonator has a semitransparent outlet mirror and a first mirror, with an active element between the mirrors, all the elements arranged perpendicular to the optical axis of the resonator. A shutter is provided behind the first mirror and a second mirror is arranged behind the shutter, perpendicular to the optical axis of the resonator. The second mirror is fully reflective for radiation with stronger laser transition and the first mirror is fully reflective for radiation with weaker laser transition and fully penetrable for radiation with stronger transition. The resonator can change frequency simply by opening or closing the shutter. It can be advantageously used, for example, in the design and construction of laser scalpels.

8 Claims, 1 Drawing Sheet

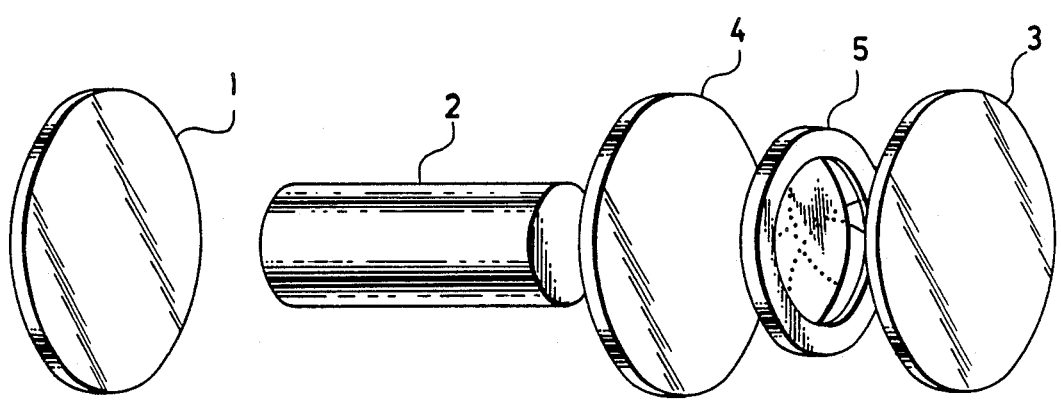

LASER RESONATOR WITH CHANGEABLE FREQUENCY OF RADIATION

FIELD OF THE INVENTION

The invention relates to a laser resonator, wherein a simple way for changing the frequency of the generated radiation is provided.

BACKGROUND OF THE INVENTION

Actually known methods for changing the frequency of the generated radiation of a laser resonator are based on an exchange of resonator mirrors or on the effect of a dispersion element within the resonator. In both cases, an accurate adjustment of optical elements is required. In the case of dispersion elements, for example, prisms are used and high requirements on the accuracy of their adjustment are made.

The more elements the resonator contains, the larger losses of efficiency of generated radiation are experienced, the adjustment is more complicated and in addition results in a rather unacceptable length of the resonator.

It is an object of this invention to provide a laser resonator where changes of the frequency of generated radiation can be achieved by simple means avoiding the disadvantages of the known methods.

SUMMARY OF THE INVENTION

The laser resonator of the present invention comprises a semitransparent outlet mirror and a first mirror, with an active element situated between said mirrors, whereby all said elements are arranged perpendicular to the optical axis of the resonator. According to the invention, a closure is provided behind the first mirror and a second mirror is arranged behind said closure perpendicular to the optical axis of the resonator. Said second mirror has a full reflectivity for radiation with a higher efficiency and the first mirror has a full reflectivity for radiation with a lower efficiency and is fully penetrable for radiation with stronger laser transition of radiation.

This linear configuration of the resonator allows a change of the frequency of the outgoing radiation generated in one direction solely by means of a closure situated in front of the second mirror. To change the frequency no exchange of mirrors, no application of a dispersion element in the resonator nor application of other elements requiring accurate adjustments in the resonator are needed. This laser resonator with changeable frequency of radiation is simple in construction.

BRIEF DESCRIPTION OF THE DRAWING

An examplary embodiment of a laser resonator with changeable frequency of radiation according to this invention is shown diagrammatically in the attached drawing.

DESCRIPTION OF THE PREFERRED EMBODIMENT

The linear configuration of the laser resonator comprises a semitransparent outlet mirror 1 and a first mirror 4, with an active element 2 between said mirrors and furthermore a second mirror 3, in front of which a closure 5 is arranged. The first mirror 4 is fully reflective for radiation with weaker laser transition of radiation and fully penetrable for radiation with stronger laser transition of radiation. A change of the generation is accomplished by a closure 5 in front of the second mirror 3.

Closure 5 may be a mechanical shutter like shutter no. 22-8411 from the Ealing Company, or any suitable shutter which effectively closes off the passage of light to the second mirror 3 and is operable to be opened so that one can select whether or not light should pass to the second mirror. Moreover, the closure 5 may advantageously be an electro-optical device functioning like a mechanical shutter. In either case, the closure 5 is openable and closeable so that one can select whether or not light reaches the second mirror.

By the term "fully penetrable mirror", we mean a mirror designed for a minimum reflectivity for a given wave length and by the term "fully reflective mirror" a mirror which for a given wave length of radiation shows the maximum possible reflectivity. In a number of lasers, various transitions can be excited to emission with the aid of a suitable resonator configuration. For example, in a Nd:YAG laser, in addition to the highly effective wavelength of 1.06 $\mu$m, there is also a transition at 1.32 $\mu$m. In the present invention, a shutter placed between the first and second mirrors allows selection of different wavelengths by exploiting the possibility of two different wavelengths at two different laser transitions (different effective cross sections of luminescence lines) in the same laser medium.

An embodiment of the resonator according to this invention has been utilized for construction of a Nd:YAG continuous laser for a wave length 1.06 $\mu$m where the active element 2 has its maximum laser transition (effective cross section of luminescence lines) of radiation and for a wave length 1.32 $\mu$m where the laser transition is three times lower. The resonator comprises an outlet semitransparent mirror 1 which offers a 95% reflectivity for 1.32 $\mu$m and 93% for 1.06 $\mu$m, provided on its outlet side with an antireflective layer for both wave lengths, a crystal Nd:YAG, forming the active element 2, with antireflective layers at front faces of the crystal for both wave lengths, a first mirror 4 with 100% reflectivity for 1.32 $\mu$m and 1% for 1.06 $\mu$m, a closure 5 and a second mirror 3 with a 100% reflectivity for 1.06 $\mu$m. The laser operates with a second mirror 3 when closure 5 is closed, on the wave length 1.32 $\mu$m. With opened closure 5, the laser operates on 1.06 $\mu$m due to strong laser transition of radiation at 1.06 $\mu$m. Outlet powers of 45 W for 1.32 $\mu$m and 70 W for 1.06 $\mu$m have been obtained at a power input of 8.5 kW in a twin elliptic p$\mu$mp cavity.

Generally, the laser resonator of the invention works in two modes with an active medi$\mu$m capable of generating two frequencies with different laser transition: (1) with mirrors 1 and 4 for generating radiation with relatively weaker laser transition with the closure 5 in the closed position, and (2) with mirrors 1 and 3 generating radiation of relatively higher efficiency with the closure 5 in the opened position in which case mirror 4 is effectively transparent.

The thus designed laser with resonator according to this invention can be utilized for example for making a laser scalpel adapted for change of the wave length of radiation transmitted by a light conducting system in the course of performance of an operation due to different absorption properties of biological materials for these two wave lengths.

The invention can also be utilized for lasers operating with other active materials in a continuous and pulsation operation.

Although the invention is described and illustrated with reference to a preferred embodiment thereof, it is to be expressly understood that it is in no way limited to the disclosure of such preferred embodiment but is capable of numerous modifications within the scope of the appended claim.

We claim:

1. A laser resonator with changeable frequency of radiation comprising:
    an active element having two laser transitions, a first transition and a second transition weaker than said first transition, both capable of generating coherent radiation of different wavelength;
    a semitransparent outlet mirror and a first mirror, said active element provided between said mirrors;
    a second mirror, said first mirror being located between said second mirror and said active element;
    an optical shutter, said shutter being located between said first mirror and said second mirror;
    said second mirror being essentially fully reflective for radiation of said first transition and said first mirror being essentially fully reflective for radiation of said second transition and essentially fully transparent for radiation of said first transition.

2. A laser resonator with changeable frequency of radiation as claimed in claim 1 wherein said active element has an optical axis and the outlet mirror, said first and second mirrors are arranged perpendicular to said optical axis.

3. A laser resonator with changeable frequency of radiation as claimed in claim 1 wherein said shutter is a mechanical shutter.

4. A laser resonator with changeable frequency of radiation as claimed in claim 1 wherein said shutter is an electro-optical shutter.

5. A laser resonator with changeable frequency of radiation comprising:
    an active element having two laser transitions, a first laser transition at a first frequency and a second laser transition at a second frequency lower than said first frequency;
    a semitransparent outlet mirror and a first mirror, said active element being located between said mirrors;
    a second mirror, said first mirror being located between said second mirror and said active element;
    an optical shutter, said shutter being located between said first mirror and said second mirror;
    said second mirror being essentially fully reflective for radiation at said first frequency and said first mirror being essentially fully reflective for radiation at said second frequency and essentially fully transparent for radiation at said first frequency;
    such that when said shutter is opened said resonator generates radiation through said outlet mirror at said first frequency and when said shutter is closed said resonator generates radiation through said outlet mirror at said second frequency.

6. A laser resonator as claimed in claim 5 wherein said active element is an Nd:YAG laser.

7. A laser resonator as claimed in claim 5 wherein said first frequency has a wavelength of approximately 1.06 $\mu$m and said second frequency has a wavelength of approximately 1.32 $\mu$m.

8. A laser resonator as claimed in claim 1 wherein said active element is an Nd:YAG laser.

* * * * *